Oct. 30, 1928.
F. W. YOUNG
1,689,418
METHOD OF ORNAMENTING FLOWER POTS
Filed April 12, 1927
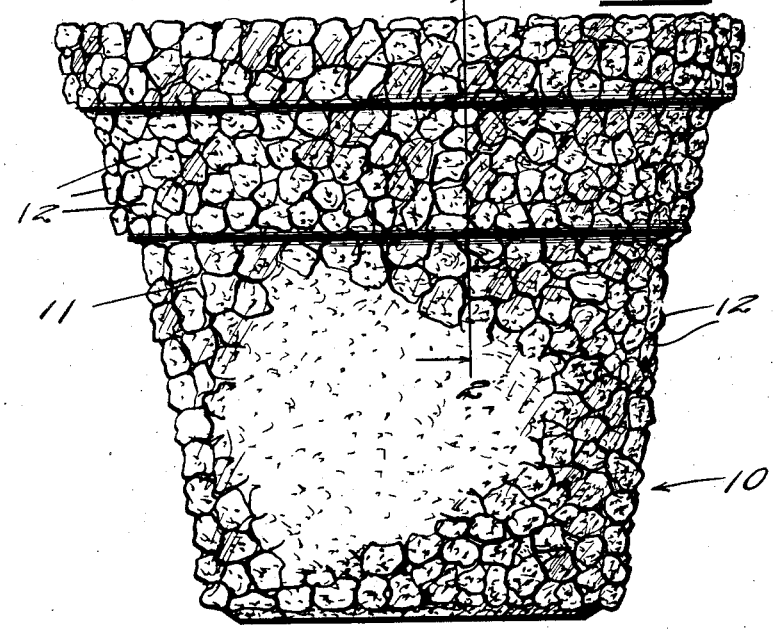
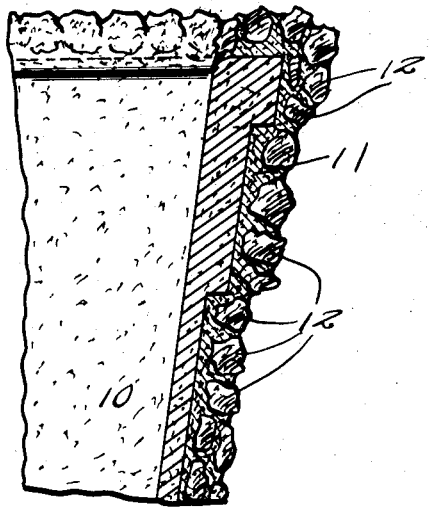
Inventor
F. W. Young
By Watson E. Coleman
Attorney Patented Oct. 30, 1928.

1,689,418

UNITED STATES PATENT OFFICE.

FRANK W. YOUNG, OF CROWN POINT, INDIANA.

METHOD OF ORNAMENTING FLOWERPOTS.

Application filed April 12, 1927. Serial No. 183,155.

This invention relates to a method of ornamenting flower pots.

An important object of the invention is to provide means whereby an ornamental exterior finish may be applied to flower pots, as now constructed, without interfering with the porous qualities of these parts, which are necessary to proper growth and health of plants placed therein.

A further object of the invention is to provide a type of ornamentation which may be economically and readily applied to articles of this character.

These and other objects I attain by the construction shown in the accompanying drawings, wherein for the purpose of illustration is shown a preferred embodiment of my invention and wherein:—

Figure 1 is a side elevation showing a flower pot ornamented in accordance with my invention;

Figure 2 is a section on the line 2—2 of Figure 1.

Referring now more particularly to the drawings, the numeral 10 indicates an ordinary flower pot, to the outer surface of which, in accordance with my invention, I apply a coating 11 consisting of a mixture of plaster of Paris, aluminum bronze and vinegar. In the outer face of this coating, while still plastic, I insert small particles 12 of porous material, such as bits of cinder or the like. The outer surfaces of the cinder and outer face of the wall coating, if so desired, may be tinted or otherwise treated and where the body of the receptacle to which the ornamentation is applied permits, the completed article is preferably fired.

The bronze powder added to the plaster of Paris provides a glistening surface therefor and the vinegar serves to prevent setting of the plaster of Paris for a sufficient length of time to allow for the embedding of the porous articles therein. It will be noted that since the plaster of Paris is of itself porous and porous elements are employed as ornamentation upon its surface, there is nothing to detract from the porous qualities of the utensil to which they are applied.

Since the method hereinbefore set forth is capable of a certain range of change and modification without materially departing from the spirit of the invention, I do not limit myself to such specific structure except as hereinafter claimed.

I claim:—

The method of ornamenting a flower pot of porous texture consisting in applying to the exterior surface and upper edge surface of the pot a plastic coating consisting of plaster of Paris, aluminum bronze and vinegar, then embedding a layer of cinders in the coating and finally firing the coating to produce an ornamental sheen surface at the exterior of the pot.

In testimony whereof I hereunto affix my signature.

FRANK W. YOUNG.